United States Patent [19]
Kim

[11] Patent Number: 5,612,603
[45] Date of Patent: Mar. 18, 1997

[54] RECTILINEAL MOVEMENT SPEED ENHANCING APPARATUS OF AN ORTHOGONAL COORDINATE ROBOT

[75] Inventor: Hee J. Kim, Suwon, Rep. of Korea

[73] Assignee: Samsung Electronics Co., Ltd., Suwon, Rep. of Korea

[21] Appl. No.: 466,525

[22] Filed: Jun. 6, 1995

[51] Int. Cl.$^6$ ............................... B25J 9/16; B25J 18/00
[52] U.S. Cl. ................... 318/568.11; 318/568.1; 414/749; 414/751; 901/26
[58] Field of Search ..................... 318/560–696; 414/751, 749, 732, 752, 753; 901/21, 26, 16, 27; 74/110, 479 BF, 89.2; 422/63, 67, 65, 100, 102; 436/47

[56] References Cited

U.S. PATENT DOCUMENTS

| | | | |
|---|---|---|---|
| 4,796,479 | 1/1989 | Wisecarver | 74/398 |
| 4,842,476 | 6/1989 | Shiotani | 414/751 |
| 5,100,286 | 3/1992 | Anderson | 414/749 |
| 5,104,621 | 4/1992 | Pfost et al. | 422/67 |
| 5,206,568 | 4/1993 | Bjornson et al. | 318/568.1 |
| 5,265,490 | 11/1993 | Azuma et al. | 74/479 BF |
| 5,324,163 | 6/1994 | Costa | 414/751 |
| 5,476,358 | 12/1995 | Costa | 414/749 |

Primary Examiner—Paul IP
Attorney, Agent, or Firm—Burns, Doane, Swecker & Mathis, L.L.P.

[57] ABSTRACT

A robotic mechanism includes a horizontal base, a vertical support mounted on the base, and a horizontal arm mounted on the vertical support. The vertical support is movable horizontally relative to the base. The arm includes a body which is movable horizontally relative to the vertical support and carries a member which is movable horizontally relative to the body. When the body moves horizontally relative to the vertical support, the member moves horizontally relative to the body to increase the effective rate of movement of the arm.

7 Claims, 6 Drawing Sheets

FIG. 7A
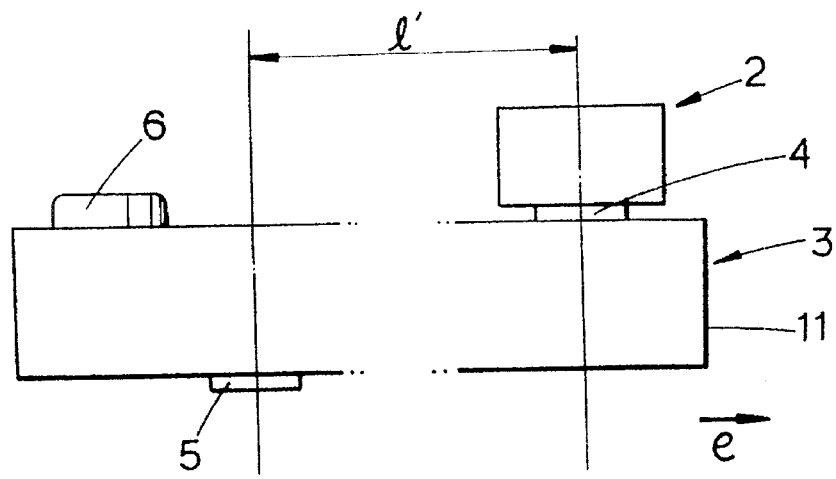
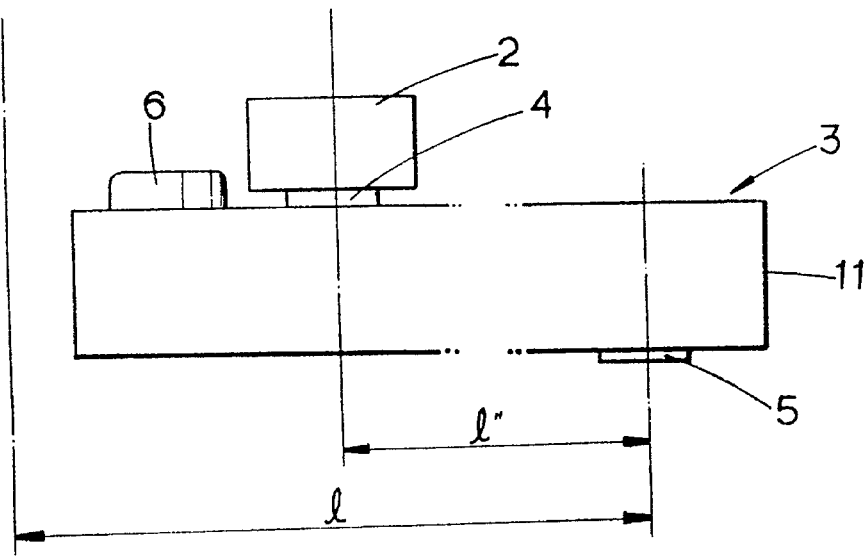
FIG. 7B

RECTILINEAL MOVEMENT SPEED ENHANCING APPARATUS OF AN ORTHOGONAL COORDINATE ROBOT

BACKGROUND OF INVENTION

The invention is related to a robot of an orthogonal coordinate type performing rectilineal movement along three axial coordinates, and particularly, to provide a rectilineal movement speed enhancing apparatus for an orthogonal coordinate robot.

A conventional orthogonal coordinate robot constitutes a mechanism performing rectilineal movement in three axial directions, in which it has three degrees of freedom respectively associated with up and down movements, left and right movements and fore and aft movements to take a product out from a system. The orthogonal coordinate robot usually has an independent freedom degree for one axis, which comprises a frame, one power driving source, a rack connected to the power driving source and a threaded portion engaged with the rack so that it is constructed as a simple rectilineal movement mechanism. The orthogonal coordinate robot has a disadvantage in that the moving distance of an arm or its stroke is usually limited.

A typical prior art proposal to resolve that disadvantage is made in Japanese Patent Laid-Open Publication No. 89-246084. This patent discloses a rectangular coordinate type robot for increasing the stroke length of an arm, in which a main ball screw is rotated by the drive of a drive motor, a main arm is moved relatively to a first arm by this rotation, the rotation of the main ball screw is transmitted by transmission mechanisms to a rotary member, and a follower arm integrated with a follower ball screw to be engaged with this rotary member is moved to the main arm in the same direction as the motion of the main arm.

But, that robot is very complex in its configuration because of requiring numerous parts such as the follower arm associated with the main arm, the follower ball screw with respect to the main ball screw, a power transmitting device for transmitting the power of a main driving source to the follower arm, etc.

Also, another method can be adapted to an orthogonal coordinate robot in order to obtain the benefit of extending the movement stroke, in which the robot comprises two unit rectilineal movement modules in the form of block structures which are constructed in a series arrangement. To this end, the robot employs two driving sources, frames moved by the two driving sources, respectively, a system for sensing the excessive movement of the frame etc. So, the robot firstly forces one unit rectilineal movement module to be operated in order to obtain a relatively longer stroke, and then after the completion of the movement of the frame, another unit rectilineal movement module must be moved. However, it has a disadvantage in that the movement speed is slow. To overcome this defect, the speed of the driving source can be selected with respect to the stroke to be increased. But in respect of its total configuration, it requires separate parts which causes the robot to be more complex as well as difficult to manufacture.

SUMMARY OF THE INVENTION

In order to resolve these disadvantages, a main objective of the invention is to provide a rectilineal movement speed enhancing apparatus of an orthogonal coordinate robot for performing two unit rectilineal movements, simultaneously, with respect to one freedom degree and determining the movement position within a predetermined time without changing the movement speed according to the increased stroke.

The other objective of the invention is to provide a rectilineal movement speed enhancing apparatus of an orthogonal coordinate robot for increasing the movement speed according to the increased stroke at the predetermined multiple with respect to one freedom degree.

Another objective of the invention is to provide a rectilineal movement speed enhancing apparatus of an orthogonal coordinate robot for increasing the movement speed twice on the stroke extended two times with respect to one freedom degree.

According to the invention, a rectilineal movement speed enhancing apparatus of an orthogonal coordinate robot comprises an arm with respect to one freedom degree, in which the arm is provided with a body having a predetermined shape, a partition wall dividing the body into two to form cavities on both of its sides, a driving source fixed to the partition wall, at least one rotating portion mounted on the partition wall and connected to each other to be simultaneously operated and at least one position determining portion for being simultaneously moved according to the rotation of the rotating portion.

Herein, it is noted that the two position determining portions are moved at the same time by one driving source. Whereby, the simultaneous movements of the two position determining portions are supposed to be speeded up between them by one driving source in respect of the time decrease. Therefore, it has an advantage in that any one of the position determining potions can be moved to the predetermined position within a short time, even if one freedom degree has a long distance stroke.

BRIEF DESCRIPTION OF DRAWINGS

The invention will be described in detail with reference to the accompanying drawings as below, in which:

FIG. 7A is a schematic plan view of an arm of the robot in a first position; and FIG. 7B is a view similar to FIG. 7A after the arm has been moved.

DETAILED DESCRIPTION OF THE PREFERRED EMBODIMENT OF THE INVENTION

Figure 1:
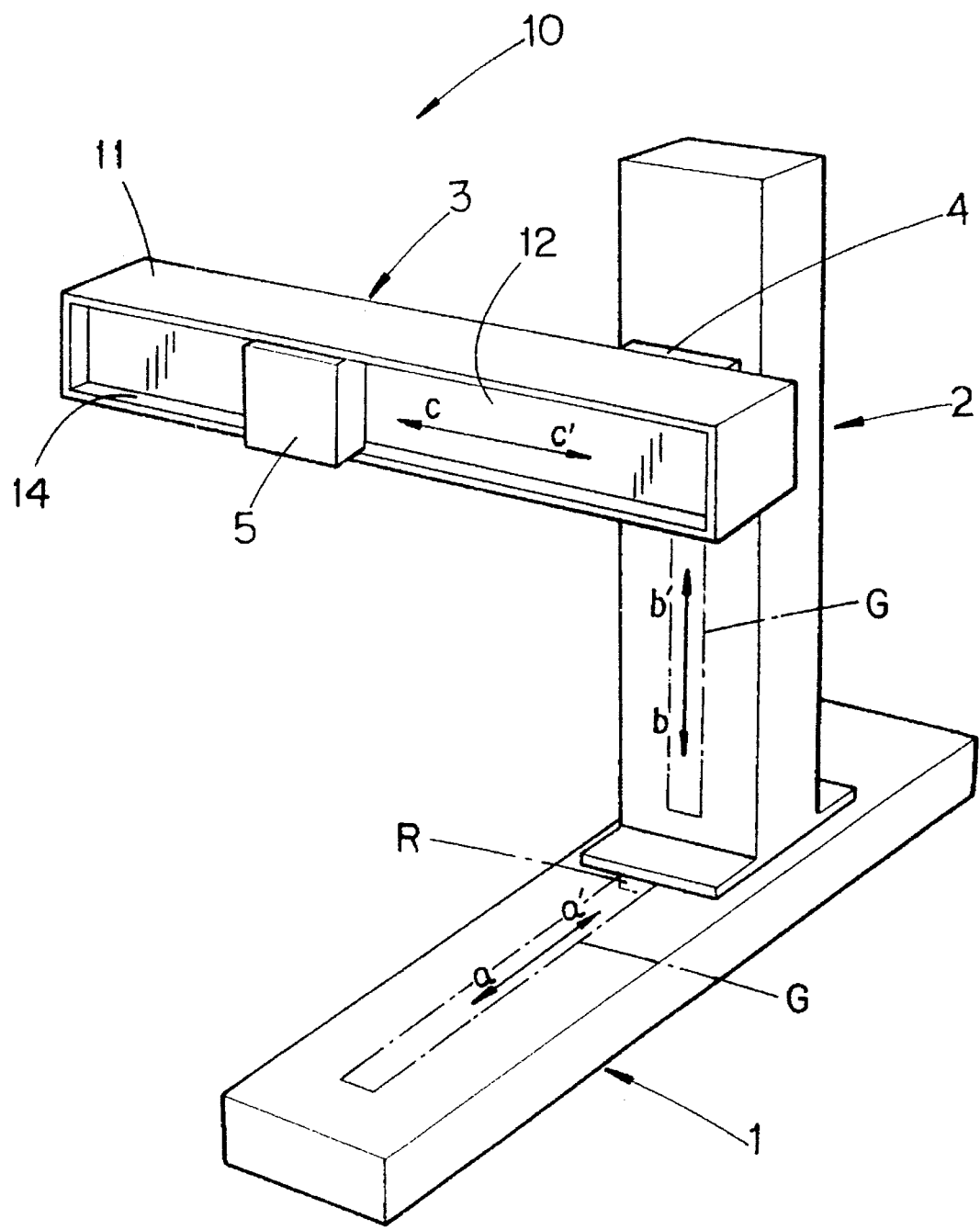
FIG. 1 is a perspective view schematically illustrating a general configuration of an orthogonal coordinate robot according to the invention.

As shown in FIG. 1, an orthogonal coordinate robot 10 comprises three degrees of freedom which are respectively called a base 1 longitudinally extended along a coordinate a-a', a vertical supporter 2 mounted on the base 1 to be reciprocated along two coordinates a-a' and an arm 3 supported at one end portion on the vertical supporter 2 to be moved in the directions of arrows b-b'and c-c'. Herein, the combination of the base 1 and the vertical supporter 2 as well as the vertical supporter 2 and the arm 3 are configured in a well-known manner with a guide structure such as a guide rail R and a guide groove G, and a driving source and a sliding member connected to the driving source to be guided in the guide structure. Therefore, a more detailed explanation is omitted, but the arm or the rectilineal movement speed enhancing apparatus of the orthogonal coordinate robot will be described in detail below. On the other hand, the full length of the arm 3 is not drawn in FIG. 1, but rather the arm 3 is supposed to be longer than the arm of the prior art.

The arm 3 is provided with two members determining portions 4 and 5, in which the first member determining portion 4 is combined at its one side with a predetermined device (not shown) of the vertical supporter 2 to move the arm 3 upward and downward, and the second position determining member 5 is movably mounted on a guide rail as described below. The second position determining member 5 is moved along a coordinate c-c' on the guide rail to grasp or take out a part.

In other words, the arm 3 comprises a body 11 in the form of a rectangular hexahedral box as illustrated in detail in FIGS. 2 to 6. The body 11 is provided with a partition wall 12 which is longitudinally extended therein to divide the inner of the body 11 into cavities 13 and 14 for the first and second position determining members 4 and 5, respectively.

A motor 6 called a driving source is mounted in one end of the partition wall 12 and includes driving shaft 7 on which a gear 8 is fixed.

A first rotating device 20 is mounted adjacent to the motor 6 and includes a shaft 16 extending through the partition wall 12. The shaft 16 is rotatably supported adjacent at its ends by bearings 17. Gears 18 and 19 are fixed to respective ends of the shaft 16, and disposed next to the gear 19 is a gear 21 having a diameter larger than gear 19 and fixed to the shaft 16. The gear 21 is connected by means of a pulley 22 to the gear 7 so that the rotation force of the motor 6 is transmitted. The sizes of the gears 7 and 19 are determined to have a predetermined speed reduction rate in order to reduce the rotation speed of the gear 19.

A second rotating device 30 is disposed at an opposite end of the position wall 12 and is configured to rotate at the same speed as that of the first rotating device 20. A rotating shaft 23 is rotatably supported by means of bearings 15 in the partition wall 12, to both ends of which gears 24 and 25 are fixed, respectively. The gear 24 is connected by means of a pulley 26 to the gear 18 of the first rotating portion 20, and the gear 25 is connected by means of a pulley 27 to the gear 19.

Figure 2:
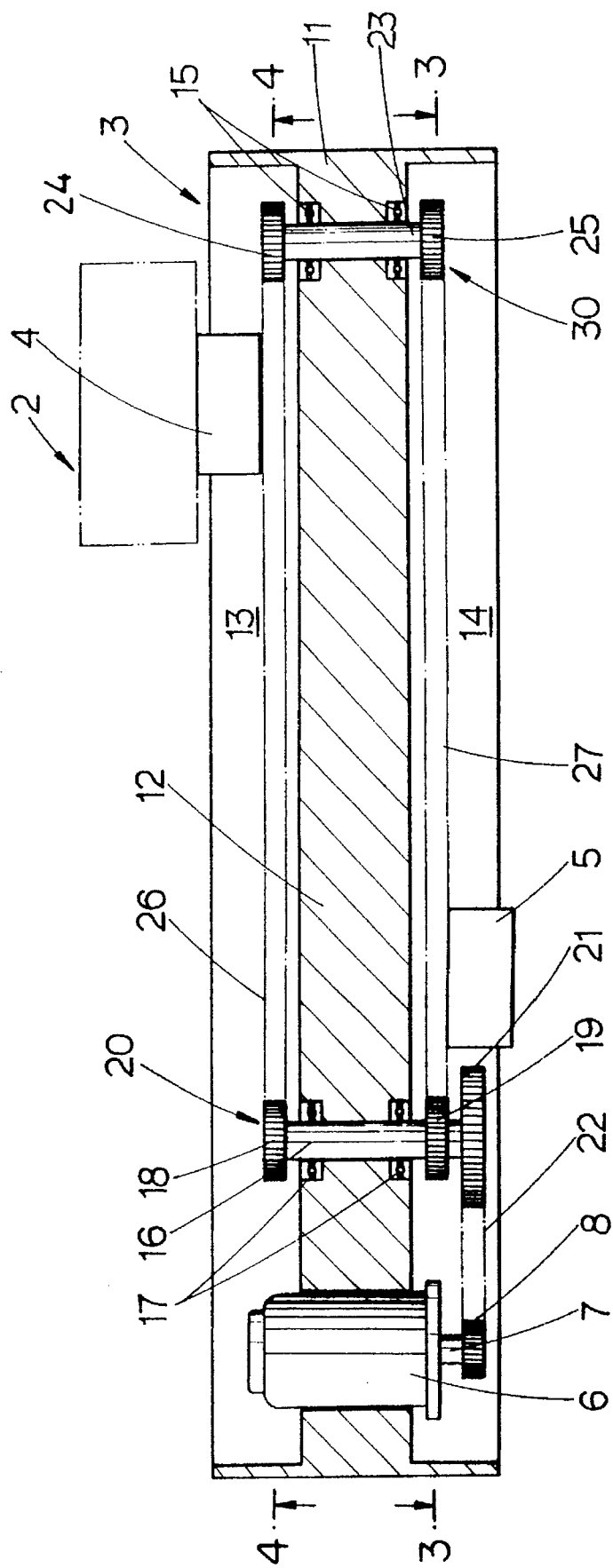
FIG. 2 is a horizontal cross-sectional view illustrating the upper portion of an arm according to the invention.
Figure 3:
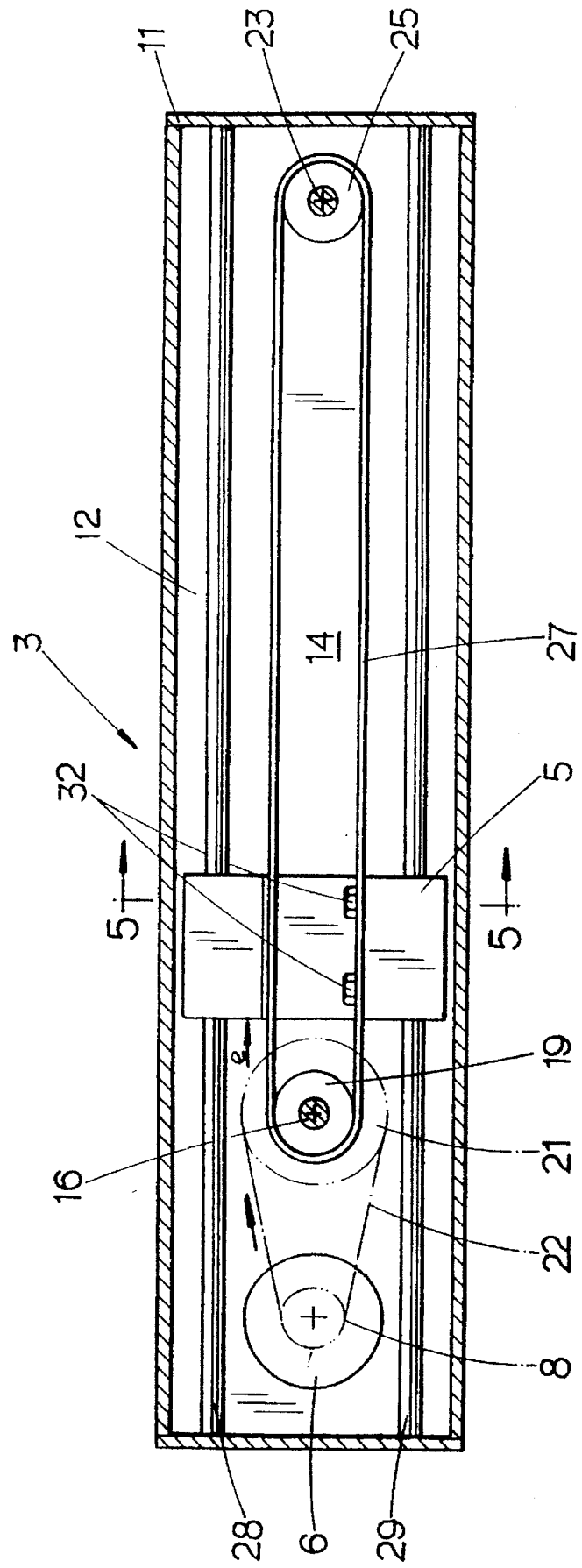
FIG. 3 is a cross-sectional view taken along line 3—3 of FIG. 2.
Figure 5:
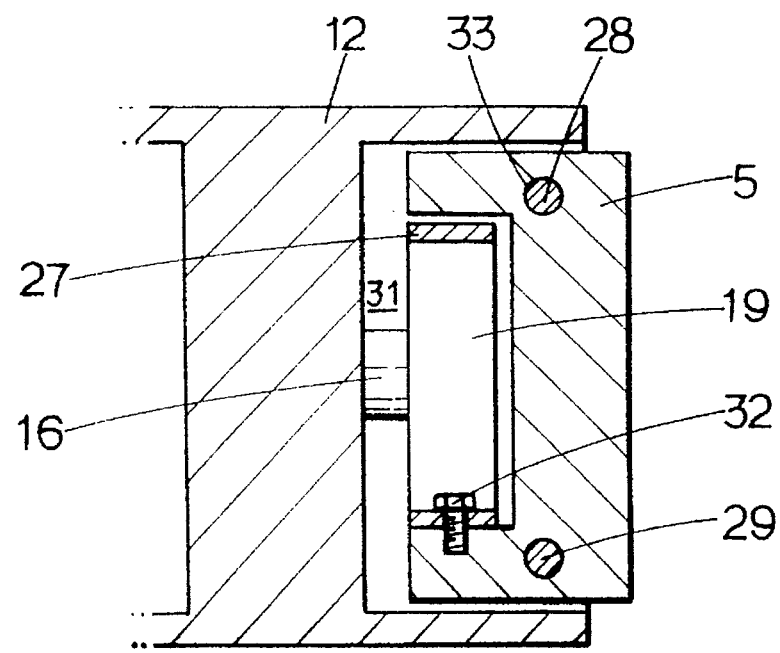
FIG. 5 is a cross-sectional view taken along line 5—5 of FIG. 3.

FIG. 3 is a cross-sectional view taken along line A—A of FIG. 2. An upper guide rail 28 and a lower guide rail 29 are mounted in cavity 14 adjacent to the partition wall 12 to the upper and lower portions of side walls of the body 11, so that the second position determining member 5 is slidably supported thereon. Therefore, as shown in FIG. 5, a section taken along line C—C of FIG. 3, the second position determining member 5 is a C-type block having a groove 31, which is separated away from the partition wall 12 and receives the pulley 27. The second position determining member 5 is at the inner lower portion of the groove 31, coupled by means of fasteners 32 such as screws with the lower portion of the pulley 27 adjacent to the gear 19. Also, holes 33 are formed through the second position determining member 5 to slidably receive the guide rails 28 and 29.

Figure 4:
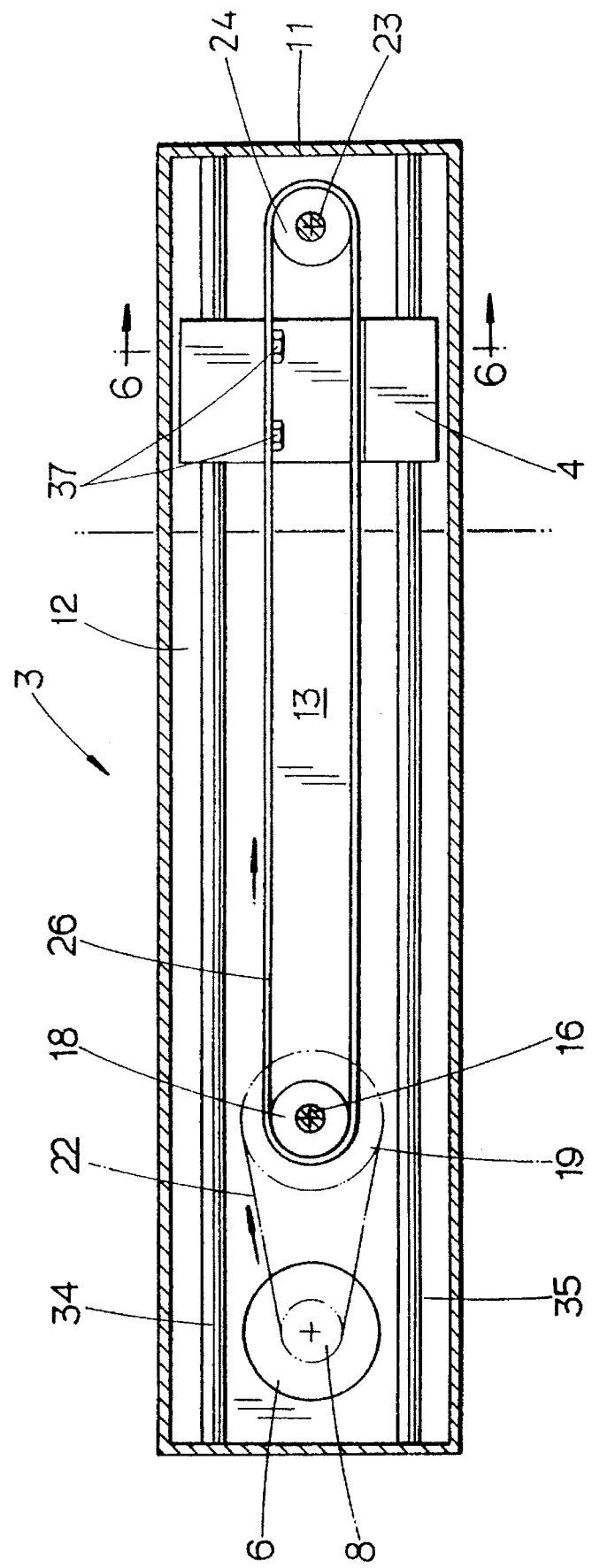
FIG. 4 is a cross-sectional view taken along line 4—4 of FIG. 2.
Figure 6:
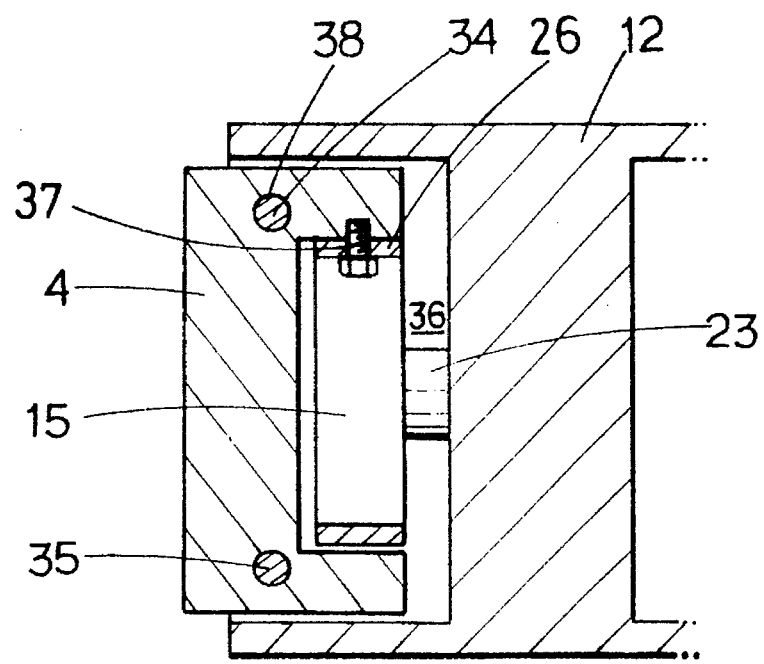
FIG. 6 is a cross-sectional view taken along line 6—6 of FIG. 3.

FIG. 4 is a cross-sectional view taken along line B—B of FIG. 2. Upper and lower guide rails 34 and 35 are mounted in the cavity 13 adjacent to the partition wall 12 to the upper and lower portions of the side walls of the body 11, so that the first position determining member 4 is slidably supported thereon. Therefore, as shown in FIG. 6, a section taken along line D—D of FIG. 4, the first position determining member 4 is a C-type block having a groove 36, which is separated away from the partition wall 12 and receives the pulley 26. Also, the first position determining member 4 is at the inner upper portion of the groove 36, coupled by means of fasteners 37 such as screws with the pulley 26 adjacent to the gear 24. Also, holes 38 are formed through the first position determining member 4 to slidably receive the guide rails 34 and 35.

As described below, the effective movement speed of the arm 3 can be increased. Thus, even though the length of the arm 3 is extended at least twice, no reduction of effective speed is noticed.

As shown in FIGS. 2, 7A and 7B, as the motor 6 is operated, the gear 8 coupled with the shaft 7 is rotated. The rotation force of the gear 8 is transmitted by means of the pulley 22 to the gear 21 of the first rotating portion 16. Thus, the gear 19 fixed on the same axle as the gear 21 is rotated, while the gears 24 and 25 are rotated by means of the pulleys 26 and 27.

At that timer if the motor is rotated to displace the body in the forward direction e, the body 11 is moved relative to the first position determining member in the direction e by a distance 1'. Also, the second position determining member 5 is moved in the direction e by a distance 1" relative to the body 11. Therefore, the actual or effective length l moved by the arm 13 is equal to the sum of the distances 1' and 1", whereby the second position determining member 6 and the body 11 have moved relative to the first position determining member 4, but the member 5 has moved twice as far (and thus twice as fast) relative to the member 4 as has the body 11, On the contrary, if the motor is reverse-rotated, the body 11 and second position determining member 5 return to the original position of FIG. 7A.

Accordingly, it is noted that the invention has a simple configuration which increases the effective movement speed of an arm and thus makes possible a relatively longer arm, thereby enabling a robot to have an improved work efficiency.

What is claimed is:

1. A robotic mechanism, comprising:

a support; and an arm mounted to said support and movable relative thereto in a rectilinear direction, said arm comprising:

a first member;;

a body mounted by said first member to said support and movable relative thereto in said rectilinear direction, a second member mounted to said body for movement relative thereto in said rectilinear direction, and a motor-activated drive mechanism connected to said body and said second member, for moving said body relative to said support in said rectilinear direction, and simultaneously moving said second member relative to said body in said rectilinear direction, to increase an effective speed of movement of said arm;

said body including two cavities separated by a partition wall, said drive mechanism comprising a motor mounted in said partition wall, a pair of rotary elements mounted to said body in respective ones of said cavities and driven at a common speed by said motor, one of said rotary elements interconnecting said body and said first member for moving said body relative to said first member in said rectilinear direction, and the other of said rotary elements interconnecting said body and said second member for moving said second member relative to said body in said rectilinear direction.

2. The robotic mechanism according to claim 1 wherein said member comprises a second member, said arm further including a first member attaching said body to said support, said body being movable relative to said first member in said direction, said drive mechanism comprising a pulley structure mounted for rotation on said body and driven by said motor, said pulley structure being fixedly connected to said first and second members.

3. The robotic mechanism according to claim 2 wherein said pulley structure further comprises first and second pulleys interconnected for common rotation and fixed to said first and second members, respectively.

4. The robotic mechanism according to claim 3 wherein said first member mounts said body to said support and is movable to adjusted positions along said support.

5. The robotic mechanism according to claim 1 wherein said rectilinear direction constitutes a first rectilinear direction, said arm being movable relative to said support member in a second rectilinear direction disposed orthogonally to said first rectilinear direction.

6. The robotic mechanism according to claim 5 further including a base, said support member being movable relative to said support member in a third rectilinear direction disposed orthogonally to said first and second rectilinear directions.

7. The robotic mechanism according to claim 6 wherein said first and third rectilinear directions are horizontal, said second rectilinear direction being vertical.

* * * * *